United States Patent
Skog (10) Patent No.: US 9,936,493 B2
(45) Date of Patent: Apr. 3, 2018

(54) TRAFFIC OPTIMIZATION IN A COMMUNICATIONS NETWORK

(71) Applicant: Telefonaktiebolaget L M Ericsson (publ), Stockholm (SE)

(72) Inventor: Robert Skog, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 154 days.

(21) Appl. No.: 14/897,036

(22) PCT Filed: Jun. 13, 2013

(86) PCT No.: PCT/SE2013/050688
§ 371 (c)(1),
(2) Date: Dec. 9, 2015

(87) PCT Pub. No.: WO2014/200399
PCT Pub. Date: Dec. 18, 2014

(65) Prior Publication Data
US 2016/0119903 A1 Apr. 28, 2016

(51) Int. Cl.
*H04W 24/02* (2009.01)
*H04W 72/04* (2009.01)
(Continued)

(52) U.S. Cl.
CPC .......... *H04W 72/042* (2013.01); *H04L 47/22* (2013.01); *H04L 65/4084* (2013.01);
(Continued)

(58) Field of Classification Search
None
See application file for complete search history.

(56) References Cited

U.S. PATENT DOCUMENTS

| 6,542,992 B1 | 4/2003 | Peirce et al. |
| 2008/0219271 A1* | 9/2008 | Ollikainen ............ H04L 69/163 370/400 |

(Continued)

OTHER PUBLICATIONS

International Search Report and Written Opinion issued in corresponding International Application No. PCT/SE2013/050688 dated Jun. 13, 2014, 8 pages.

*Primary Examiner* — Chi H Pham
*Assistant Examiner* — Shick Hom
(74) *Attorney, Agent, or Firm* — Rothwell, Figg, Ernst & Manbeck, p.c.

(57) ABSTRACT

A method for optimizing network traffic that is delivered to a client via a RAN is disclosed. The method includes: receiving, at a first node, a request for content transmitted by the client, including an indication pertaining to a first traffic optimization functionality into the request, and forwarding the modified request to a second node located upstream. At the second node, receiving the request and forwarding the request to a server. At the second node, receiving downlink traffic related to the request, optimizing the downlink traffic, and forwarding the downlink traffic to the first node. In optimizing the downlink traffic, the second node omits traffic optimization functionality corresponding to the first traffic optimization functionality. The first node then receives the downlink traffic, optimizes the downlink traffic, and forwards the optimized downlink traffic to the client.

39 Claims, 4 Drawing Sheets

(51) Int. Cl.
  *H04L 29/08*   (2006.01)
  *H04L 12/815*  (2013.01)
  *H04L 29/06*   (2006.01)
  *H04W 4/20*    (2018.01)

(52) U.S. Cl.
  CPC ......... *H04L 67/2804* (2013.01); *H04W 24/02* (2013.01); *H04L 67/2885* (2013.01); *H04L 69/04* (2013.01); *H04W 4/20* (2013.01)

(56) References Cited

U.S. PATENT DOCUMENTS

| | | | |
|---|---|---|---|
| 2009/0182843 A1 | 7/2009 | Hluchyj et al. | |
| 2012/0131138 A1* | 5/2012 | Swenson | H04L 47/808 709/217 |
| 2014/0019590 A1* | 1/2014 | Piernot | H04L 67/2823 709/217 |
| 2014/0133293 A1* | 5/2014 | Ismail | H04W 48/06 370/229 |

* cited by examiner

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port ||||||||||||||| | Destination port |||||||||||||||| |
| 4 | 32 | Sequence number ||||||||||||||||||||||||||||||||
| 8 | 64 | Acknowledgement number (if ACK set) ||||||||||||||||||||||||||||||||
| 12 | 96 | Data offset |||| Reserved 0 0 0 ||| N S | C W R | E C E | U R G | A C K | P S H | R S T | S Y N | F I N | Window size |||||||||||||||| |
| 16 | 128 | Checksum |||||||||||||||| | Urgent pointer (if URG set) |||||||||||||||| |
| 20 ... | 160 ... | Options ||||||||||||||||||||||||||||||||

| 310 | kind_1 | 1 | 01100000 |
|---|---|---|---|
| 320 | kind_2 | 1 | 01011000 |

TRAFFIC OPTIMIZATION IN A COMMUNICATIONS NETWORK

CROSS REFERENCE TO RELATED APPLICATION(S)

This application is a 35 U.S.C. §371 National Phase Entry Application from PCT/SE2013/050688, filed Jun. 13, 2013, designating the United States, the disclosure of which is incorporated by reference.

TECHNICAL FIELD

The invention relates to methods of optimizing downlink traffic in a communications network, wherein the downlink traffic is delivered to a client of the communications network via a Radio Access Network (RAN), corresponding computer programs and computer program products, and corresponding network nodes.

BACKGROUND

Due to the increase in data traffic in mobile networks, such as Smart Mobile Broadband (SMBB) networks, optimization of network traffic has become increasingly important. In particular, this applies to downlink traffic which is delivered to clients of a RAN, i.e., User Equipment's (UEs) such as mobile phones, computers, tablet computers, media players, and the like. Such downlink traffic typically comprises data which is delivered from a server providing content, e.g., streamed media, web pages, or software for download, to a client which has request the content. In the present context, traffic optimization, sometimes also referred to as traffic shaping, refers to improving utilization of radio resources, e.g., control signaling and allocation of air interface resources for data transmission between a UE and an access node of the RAN, as well as reducing power consumption in the UE, thereby prolonging UE battery lifetime.

Traffic optimization is typically performed by a network node of a communications network through which a client retrieves content. For instance, traffic optimization may be performed by content providers, i.e., servers, or proxies, such as HyperText Transfer Protocol (HTTP) and Transmission Control Protocol (TCP) proxies, which are used for routing and processing traffic. In the present context, traffic optimization is to be understood to encompass, but is not limited to, pacing, de-pacing, throttling, content compression, video transcoding, video transrating, parental control, and the like. Typically, the type of traffic optimization which is performed is dependent on a type of traffic, i.e., whether the traffic relates to streamed media, software downloads, web browsing, time critical vs. non-time critical traffic, and so forth.

Network nodes performing traffic optimization, such as proxies, maybe placed at different locations in a communications network and may provide different kind of traffic optimization functionality, depending on whether a proxy is located downstream, i.e., close to the RAN or even integrated with the RAN, or upstream, i.e., further away from the RAN.

Proxies which are located close to, or integrated with, the RAN may perform traffic optimization which is based on effecting downswitching of radio states, such as Radio Resource Control (RRC) states in a Universal Mobile Telecommunications System (UMTS), during idle periods of transmission over the RAN air interface. Such traffic optimization functionality, sometimes referred to as radio-friendly pacing, may be based on signaling indications pertaining to idle transmission periods to a control node of the RAN, thereby enabling the RAN to switch to less resource consuming radio states directly at the onset of idle periods rather than in response to an inactivity timer triggering downswitching.

In scenarios where downlink traffic passes through a chain of proxies performing traffic optimization, or where traffic originates at a server performing traffic optimization and subsequently passes a traffic optimization proxy when being delivered to a client, problems may arise when traffic undergoes traffic optimization at several locations.

SUMMARY

It is an object of the invention to provide an improved alternative to the above techniques and prior art.

More specifically, it is an object of the invention to provide an improved optimization of network traffic which is delivered to a wireless client of a communications network, i.e., a client which receives the network traffic via a RAN.

These and other objects of the invention are achieved by means of different aspects of the invention, as defined by the independent claims. Embodiments of the invention are characterized by the dependent claims.

According to a first aspect of the invention, a method of optimizing downlink traffic in a communications network is provided. The downlink traffic is delivered to a client of the communications network. The downlink traffic is delivered via a RAN. The method comprises receiving from the client a request for content. The request is received at a first network node of the communications network. The first network node is arranged for optimizing downlink traffic. The method further comprises, at the first network node, including an indication into the request and forwarding the request to a second network node of the communications network. The indication pertains to a first traffic optimization functionality of the first network node. The second network node is located upstream with respect to the first network node. It is arranged for optimizing downlink traffic according to a second traffic optimization functionality. The second traffic optimization functionality corresponds at least in part to the first traffic optimization functionality. The method further comprises, at the second network node, receiving the request from the first network node and determining whether the request comprises the traffic optimization functionality indication. The method further comprises determining whether the downlink traffic relates to a request comprising the traffic optimization functionality indication, optimizing the downlink traffic, and forwarding the downlink traffic to the first network node. In optimizing the downlink traffic, traffic optimization functionality which corresponds to the first traffic optimization functionality is omitted if the downlink traffic relates to a request comprising the traffic optimization functionality indication. The method further comprises, at the first network node, receiving the downlink traffic from the second network node, optimizing the downlink traffic according to the first traffic optimization functionality, and forwarding the downlink traffic to the client.

According to a second aspect of the invention, a method of optimizing downlink traffic in a communications network is provided. The method is performed at a first network node of the communications network. The downlink traffic is delivered to a client of the communications network. The downlink traffic is delivered via a RAN. The method comprises receiving from the client a request for content, including an indication into the request, and forwarding the request to a second network node of the communications network. The indication pertains to a first traffic optimization functionality of the first network node. The second network node is located upstream with respect to the first network node. The method further comprises receiving the downlink traffic from the second network node, optimizing the downlink traffic according to the first traffic optimization functionality, and forwarding the downlink traffic to the client.

According to a third aspect of the invention, a computer program is provided. The computer program comprises computer program code. The computer program code is adapted, if executed on a processor, to implement the method according to the second aspect of the invention.

According to a fourth aspect of the invention, a computer program product is provided. The computer program product comprises a computer readable storage medium. The computer readable storage medium has the computer program according to the third aspect of the invention embodied therein.

According to a fifth aspect of the invention, a method of optimizing downlink traffic in a communications network is provided. The method is performed at a second network node of the communications network. The downlink traffic is delivered to a client of the communications network. The downlink traffic is delivered via a RAN. The method comprises receiving from a first network node of the communications network a request for content and determining whether the request comprises an indication. The first network node is located downstream with respect to the second network node. The indication pertains to a first traffic optimization functionality of the first network node. The method further comprises determining whether the downlink traffic relates to a request comprising the traffic optimization functionality indication, and optimizing the downlink traffic. In optimizing the downlink traffic, traffic optimization functionality which corresponds to the first traffic optimization functionality is omitted if the downlink traffic relates to a request comprising the traffic optimization functionality indication. The method further comprises forwarding the downlink traffic to the first network node.

According to a sixth aspect of the invention, a computer program is provided. The computer program comprises computer program code. The computer program code is adapted, if executed on a processor, to implement the method according to the fifth aspect of the invention.

According to a seventh aspect of the invention, a computer program product is provided. The computer program product comprises a computer readable storage medium. The computer readable storage medium has the computer program according to the sixth aspect of the invention embodied therein.

According to an eighth aspect of the invention, a first network node for optimizing downlink traffic in a communications network is provided. The downlink traffic is delivered to a client of the communications network via a RAN. The first network node comprises a processor and a memory. The memory comprises instructions executable by the processor, whereby the first network node is operative to receive from the client a request for content, include an indication into the request, and forward the request to a second network node of the communications network. The indication pertains to a first traffic optimization functionality of the first network node. The second network node is located upstream with respect to the first network node. The first network node is further operative to receive downlink traffic from the second network node, optimize the downlink traffic according to the first traffic optimization functionality, and forward the downlink traffic to the client.

According to a ninth aspect of the invention, a second network node for optimizing downlink traffic in a communications network is provided. The downlink traffic is delivered to a client of the communications network via a RAN. The second network node comprises a processor and a memory. The memory comprises instructions executable by the processor, whereby the second network node is operative to receive from a first network node of the communications network a request for content and determine whether the request comprises an indication. The first network node is located downstream with respect to the second network node. The indication pertains to a first traffic optimization functionality of the first network node. The second network node is further operative to determine whether the downlink traffic relates to a request comprising the traffic optimization functionality indication and optimize the downlink traffic. In optimizing the downlink traffic, the second network node is further operative to omit traffic optimization functionality which corresponds to the first traffic optimization functionality if the downlink traffic relates to a request comprising the traffic optimization functionality indication. The second network node is further operative to forward the downlink traffic to the first network node.

The invention makes use of an understanding that traffic optimization in a communications network can be improved by coordinating traffic optimization performed by separate entities, i.e., network nodes, in the communications network. In particular, this applies to situations where downlink traffic is delivered to a client of the communications network via a RAN, i.e., over a wireless link. The client may, e.g., be a UE such as a mobile phone, computer, tablet computer, media player, and the like. The separate entities for performing traffic optimization may, e.g., be a server from which the downlink traffic originates and which is also arranged for optimizing the downlink traffic according to certain policies or network conditions, and a proxy located downstream with respect to the server. As an alternative, the separate entities may also be two proxies through which the downlink traffic passes when being delivered to the client. The proxy or proxies may, e.g., be HTTP or TCP proxies which are arranged for performing traffic optimization and, optionally, other tasks such as routing, address translation, and so forth. The proxy which is located closer to the RAN, i.e., throughout this disclosure also referred to as the first network node, may also be integrated with the RAN and may be part of an access node, control node, or any other node of the RAN. The first network node may also be part of an SMBB. An embodiment of the invention may, with respect to the first network node, be arranged for optimizing traffic based on actions performed at the first network node and the RAN which are coordinated so as to perform traffic optimization in a radio-friendly manner.

Traffic optimization in accordance with an embodiment of the invention amounts to coordinating traffic optimization functionality which is performed at the separate entities, the first and the second network node of the communications network, such as two proxies. To this end, the first network node, which is located downstream, receives a request for content from the client and includes an indication into the request before forwarding the request to the second, upstream, network node. The indication comprises information pertaining to the first traffic optimization functionality which is performed by the first network node on downlink traffic which it expects to receive in response to the request. Upon receiving the response, the second network node determines whether the response comprises the indication. Subsequently, the second network node optimizes downlink traffic which is destined for the client. The downlink traffic may either originate from the second network node, in which case the second network node provides the request content, i.e., such as a media server, or from a server to which the second network node forwards the request for content and, subsequently, receives downlink traffic in response to the request. The second network node determines whether the downlink traffic relates to a request comprising the traffic optimization functionality indication and performs traffic optimization in accordance with the second traffic optimization functionality it provides. If the downlink traffic relates to a request comprising the indication, the second network node omits traffic optimization functionality which subsequently is performed by the first network node located downstream with respect to the second network node, i.e., the first traffic optimization functionality.

Traffic optimization in accordance with an embodiment of the invention is advantageous in that traffic optimization performed by separate entities of the communications network may be coordinated so as to avoid performing the same functionality twice, first in the second network node and subsequently in the first network node. This is achieved by the first network node informing the second network node about which traffic optimization functionality the first network node is about to apply to downlink traffic. Thereby, resource consumption and latency are reduced, and efficiency of the performed traffic optimization is improved. In addition, an embodiment of the invention is advantageous in that control of where certain traffic optimization functionality is performed is improved. For instance, certain traffic optimization functionality is preferably performed at a downstream proxy, such as the first network node, while other traffic optimization functionality may be performed at the upstream proxy, i.e., the second network node. Traffic optimization functionality which preferably is performed at the first network node may, e.g., be based on an interaction between the first network node and the RAN, in particular a control node of the RAN, and which serves to coordinate switching of RAN radio states with burst patterns of the optimized traffic.

The request may be a TCP request, an Internet Protocol (IP) request, or an HTTP request. Correspondingly, the downlink traffic may comprise one or more TCP responses, one or more IP responses, or one or more HTTP responses, respectively. Consequently, the communication session is a TCP session, an IP session, or an HTTP session, respectively.

According to an embodiment of the invention, each of the first and the second traffic optimization functionality comprises one or more traffic optimization functions. Further, the traffic optimization functionality indication comprises information pertaining to the one or more traffic optimization functions comprised in the first traffic optimization functionality. That is, the traffic optimization functionality, or capability, i.e., the type of traffic optimization a network node provides, is a set of functions such as pacing, de-pacing, throttling, content compression, video transcoding, video transrating, parental control, and the like. The first and the second traffic optimization functionality may comprise different traffic optimization functions, where at least one of the functions is provided by both the first and the second network node. In order to notify the second network node about which functions the first network node is about to apply to downlink traffic, the first traffic optimization functionality indication may comprise more detailed information about the functions comprised in the first traffic optimization functionality, i.e., the functions performed by the first network node. To this end, the indication may comprise one or more several information elements for conveying the information. This is advantageous in that the first and the second network node may perform different types of traffic optimization without performing the same kind of traffic optimization twice.

According to an embodiment of the invention, the method further comprises selecting the traffic optimization functions comprised in the first traffic optimization functionality based on a type of downlink traffic the request relates to. That is, if the first network node provides different traffic optimization functions, i.e., different types of traffic optimization, the first network node may be arranged for selecting one or more of the available traffic optimization functions. The selection may be dependent on a type of traffic to which the request relates. For instance, if the client request streamed media, such as video, the first network node may select a certain type or certain types of traffic optimization functions, while a different type or different types of traffic optimization functions may be selected if the client requests a web page. This is advantageous in that traffic optimization may be tailored according to the type of expected downlink traffic as well as, optionally, network conditions, policies, and the like.

According to an embodiment of the invention, at least one of the traffic optimization functions comprised in the first traffic optimization functionality relates to traffic shaping based on an interaction between the first network node and the RAN to effect switching of radio states in the RAN. For instance, such traffic optimization functionality may relate to radio-friendly pacing and may involve signaling information pertaining to the onset of idle transmission periods to a control node of the RAN. This is advantageous in that the RAN may use opportunities for downswitching of radio states, thereby improving utilization of radio resources and reducing UE power consumption.

According to an embodiment of the invention, the including a traffic optimization functionality indication into the request is dependent on a type of downlink traffic the request relates to. For instance, the indication is only included for traffic types which benefit from traffic optimization being performed at the first network node.

According to an embodiment of the invention, the method further comprises, at the second network node, in response to determining that the request comprises the traffic optimization functionality indication, saving information pertaining to a communication session to which the request relates. Further, the determining whether the downlink traffic relates to a request comprising the traffic optimization functionality indication is based on the saved information. That is, in order to subsequently be able to identify whether downlink traffic relates to a request comprising the traffic optimization functionality indication, the second network node is arranged for identifying a communication session to which the request relates and saving that information. When downlink traffic is received, or provided, by the second network node, the saved information may be used to determine if, and what kind of, traffic optimization is performed by the first network node.

According to an embodiment of the invention, the saving information pertaining to a communication session to which the request relates comprises saving an identifier of the communication session. Further, the determining whether the downlink traffic relates to a request comprising the traffic optimization functionality indication comprises looking up an identifier of a communication session to which the downlink traffic relates. To this end, the identifier may be saved in a list, or a database, such as a list comprising information about ongoing communication sessions, or a list of identifiers of communications sessions for which traffic optimization is performed by the first network node.

According to an embodiment of the invention, the method further comprises, at the second network node, forwarding the request to a server providing the requested content and receiving the downlink traffic. This embodiment relates to the case where the requested content is provided by a network node other than the second network node, e.g., a server, such as a media server, a web server, or the like.

According to an embodiment of the invention, the traffic optimization functionality indication is included into a header of the request. Signaling the traffic optimization functionality indication in the header of a request is advantageous in that is does not require additional signaling. Including information pertaining to the traffic optimization functions performed by the first network node in the header is an efficient way of conveying the information to the second network node. For instance, if the request is a TCP request, the traffic optimization functionality indication is included into a header of the TCP request. As an alternative, if the request is an IP request, the traffic optimization functionality indication is included into a header of the IP request. As a further alternative, if the request is an HTTP request, the traffic optimization functionality indication is included into a header of the HTTP request.

Even though advantages of the invention have in some cases been described with reference to embodiments of the first, second, or fifth, aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

In the following, an embodiment of the invention is described with reference to FIG. 1, which schematically illustrates a communications network 100 for optimizing downlink traffic, i.e., network traffic which is transmitted from a server 105 to a client 101 via a RAN 102. The client 101 may, e.g., be a UE, such as a mobile phone, computer, tablet computer, media player, or the like, accessing the communications network 100 via the RAN 102. Thus, the UE 101 receives the downlink traffic over a wireless link 110. The RAN 102 may, e.g., be a UMTS network, an LTE network, a Wireless local Area Network (WLAN), or the like. Typically, communications over the wireless link 110 are effected in up- and downlink, i.e., from the UE 101 to an access node of the RAN 102 and vice versa, respectively. In addition to the access node with which the UE 101 communicates, such as a Radio Base Station (RBS), NodeB, or eNodeB, the RAN 102 typically comprises a control node, such as a Radio Network Controller (RNC), eNodeB, or the like. The control node has, among others, the task of setting up, configuring, and releasing, radio links, such as the wireless link 110, and allocating radio resources to UEs, i.e., frequency bands and time slots.

Further with reference to FIG. 1, and with reference to the sequence diagram 200 shown in FIG. 2, which illustrates the UE 101 requesting content from the server 105 of the communications network 100, traffic optimization in accordance with an embodiment of the invention is described in the following.

The UE 101 may request content from a network node providing the requested content, such as the server 105. The requested content may be any type of data which is transmitted, on request by the UE 101, from the server 105 to the UE 101. For instance, the requested content may be streamed media, such as audio or video, software for download, a web page, and so forth. The server 105 may be any kind of network node being arranged for providing such content on request by UE 101, e.g., a media server, a web server, or the like.

More specifically, the UE 101 transmits a request 211 for content to an access node of the RAN 102. The request may, e.g., be a TCP request, an IP request, or an HTTP request, as is known in the art. For the sake of simplicity, embodiments of the invention are in the following described as being based on TCP requests, but the invention is not limited to that. Rather, any type of protocol for requesting and retrieving content, and which allows including a traffic optimization functionality indication into the request, may be used.

Figure 1:
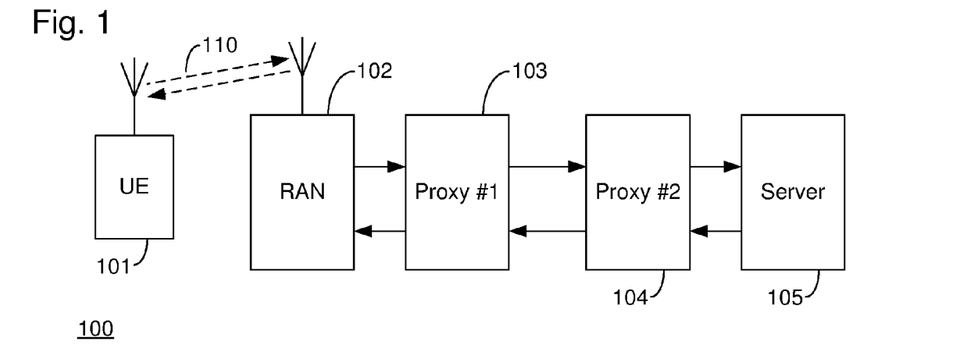
FIG. 1 is a communications network for optimizing downlink traffic, in accordance with embodiments of the invention.
Figure 2:
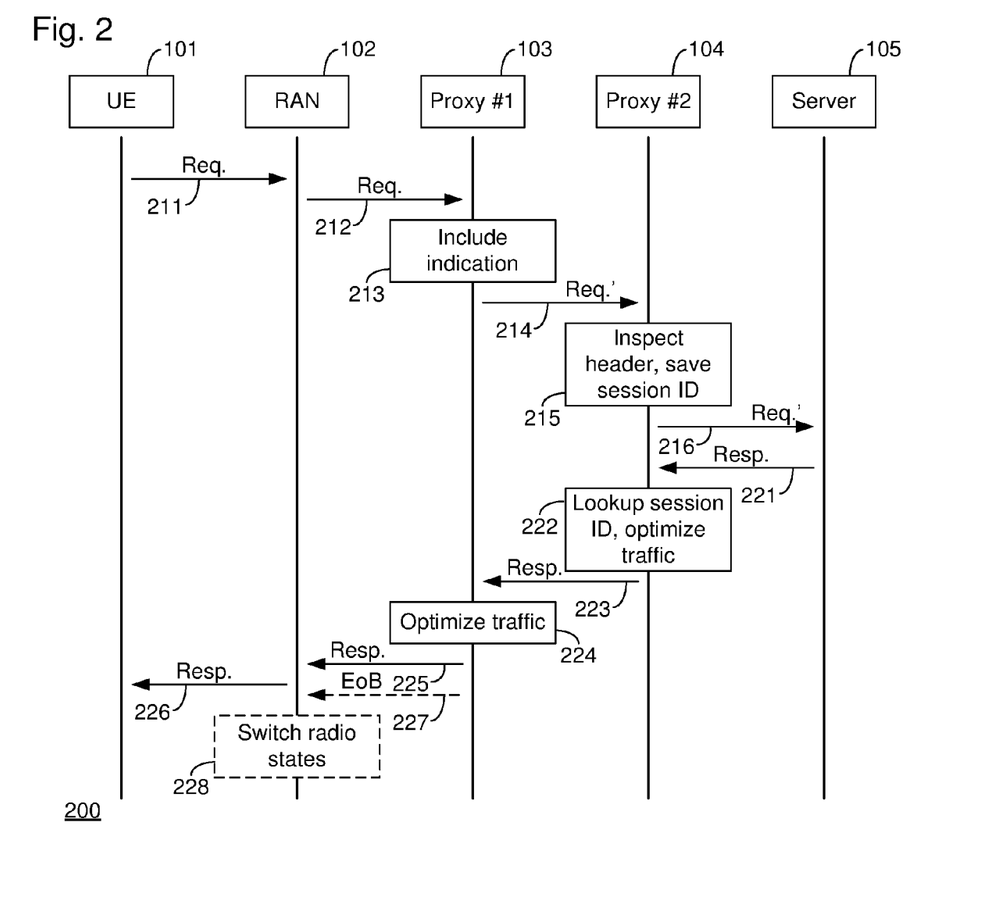
FIG. 2 illustrates optimizing downlink traffic, in accordance with embodiments of the invention.

The access node of the RAN 102 forwards the request 212, optionally via other nodes of the RAN, such as a control node, to the first network node 103, which is illustrated as a first proxy 103 providing traffic optimization ("Proxy #1" in FIGS. 1 and 2). The first proxy may, e.g., be a TCP or an HTTP proxy. The first proxy 103 may be integrated with the RAN 102, e.g., with the control node of the RAN 102, or may be arranged so as to form an SMBB.

In response to receiving the request 212 from the RAN 102, the first proxy 103 includes an indication 213 into the request. More specifically, the indication is included 213 into a header of the TCP request. The indication pertains to a first traffic optimization functionality, i.e., it comprises information about traffic optimization functionality the first proxy 103 is about to apply to downlink traffic 225 which subsequently is received by the first proxy 103 in response to the request. For instance, the indication may simply indicate that the first proxy 103 is going to perform traffic optimization on the downlink traffic 225. In the event that the first 103 proxy provides several traffic optimization functions, i.e., a set of different traffic optimization functions, the indication may comprise information pertaining to which of the provided traffic optimization functions the first proxy 103 is about to apply to downlink traffic 225. Examples of traffic optimization functions are pacing, de-pacing, throttling, content compression, video transcoding, video transrating, parental control, and the like. Different ways of including the traffic optimization functionality indication into the TCP header, as well as information describing which traffic optimization functions are provided by the first proxy 103, are described further below, with reference to FIG. 3.

The set of traffic optimization functions comprised in the first traffic optimization functionality may be predetermined, e.g., set by the manufacture of the first proxy 103, or configured by an operator of the first proxy 103 or the RAN 102. Alternatively, they may by selected dynamically, e.g., in response to a type of downlink traffic to which the request 212 relates, network conditions, policies, and so forth. In the latter case, the first proxy 103 selects the traffic optimization functions before including 213 the indication into the request and transmitting 214 the request to the second network node 104, which is located upstream with respect to the first proxy 103 and which is illustrated as a second proxy 104 providing traffic optimization ("Proxy #2" in FIGS. 1 and 2). The second proxy may, e.g., be a TCP or an HTTP proxy.

Upon receiving the request 214 at the second proxy 104, the second proxy 104 inspects 215 the header 300 of the TCP request, in particular the "Options" field, as is described further below with reference to FIG. 3. If a traffic optimization functionality indication is detected, the second proxy 104 analyses the information comprised in the indication, such as which traffic optimization functions are performed by the first proxy 103 on downlink traffic 225 which subsequently is delivered to the UE 101. The second proxy 104 saves this information, together with an identifier of a communication session ("session ID" in FIG. 2) to which the request 211 relates. In the present context, a communication session is understood to be a sequence of related requests and responses. Since TCP packets, i.e., TCP requests and TCP responses, do not include a session identifier, network nodes involved in a TCP session may use address information which is comprised in TCP packets, such as the "Source port", the "Destination port" (see TCP header 300 in FIG. 3), or a combination thereof, for identifying a session. Saving a session identifier and related information may, e.g., be accomplished by utilizing a list, a look-up table, or a database, 706 provided by the second proxy 104, e.g., in a memory 704 of the second proxy 104. In the event that the indication received with the request 214 does not comprise any further information regarding which type of traffic optimization functionality is performed by the first proxy 103, the second proxy 104 may only save the session identifier.

Subsequently, the request is forwarded 216 to the server 105 providing the requested content. It will be appreciated that the request may pass other nodes of the communications network 100 not shown in FIGS. 1 and 2, and even other communications networks, such as a Local Area Network (LAN), Wide Area Network (WAN), or the Internet. Alternatively, instead of forwarding 216 the request to the server 105, the content may be provided by the second network node 104, in which case the second network 104 node is a media server, a web server, or any other server providing the requested content, and which is further arranged for performing traffic optimization.

After transmitting the request 216 to the server 105, the second proxy 104 receives downlink traffic 221 from the server 105, i.e., one or more data packets. In response to receiving the downlink traffic 221, the second proxy 104 determines whether the received downlink traffic 221 relates to a request comprising the traffic optimization functionality indication, such as the request from the client 101 forwarded 216 to the server 105. This determination is based on determining the identifier of a communication session to which the downlink traffic 221 relates, e.g., by deriving a session identifier based on the "Source port" or the "Destination port" of the TCP header 300 (see FIG. 3), or a combination thereof, and looking up the session identifier in the list, look-up table, or database, 706 provided by the second proxy 104, as was described hereinbefore.

If the received downlink traffic 221 is a response to the request forwarded 216 to the server 105, the second proxy 104 performs traffic optimization 222 on the received response 221. The type of traffic optimization which is performed on the received downlink traffic 221 corresponds to a second traffic optimization functionality of the second proxy 104, wherein functionality which corresponds to the first traffic optimization functionality is omitted. In other words, the second proxy 104 performs only traffic optimization functions which are not performed by the first proxy 103 once the downlink traffic is forwarded 223 to the first proxy 103. That is, in terms of set theory, assuming that each of the first and the second traffic optimization functionality are a set of traffic optimization functions, wherein the intersection of the first traffic optimization functionality and the second traffic optimization functionality is non-empty, the second proxy 104 performs traffic optimization functions comprised in the set difference of the second traffic optimization functionality and the first traffic optimization functionality.

As an example, if the first proxy 103 has notified 214 the second proxy 104 that it will perform 224 traffic optimization functions "A", "B", and "C", and the second proxy 104 is capable of performing traffic optimization functions "B", "C", and "D", the second proxy 104 performs 222 traffic optimization functions "D" before forwarding the downlink traffic 223 to the first proxy 103. In response to receiving the downlink traffic 223, the first proxy optimizes the downlink traffic 224 according to the first traffic optimization functionality, i.e., in the present example traffic optimization functions "A", "B", and "C", before forwarding the downlink traffic 225 to the RAN 102 which, in turn, transmits the downlink traffic 226 to the client 101.

Further with reference to FIG. 2, the first proxy 103 may be arranged for providing traffic optimization functionality which is based on an interaction 227 between the first proxy 103 and the RAN 102, in particular a control node of the RAN 102 which has the task controlling radio resources. For instance, if the first proxy 103 provides radio-friendly pacing to the received downlink traffic 223, which amounts to shaping the downlink traffic 223 into a pattern, or sequence, of high-bitrate bursts and idle periods during which no data is transmitted, the first proxy 103 may signal an indication 227 of the onset of an idle period to the control node of the RAN 102. Such an indication 227 is also referred to as End-of-Burst (EoB) signal. In response to receiving the EoB signal 227, the control node of the RAN 102 may effect downswitching 228 of radio states, such as RRC states in a UMTS network, depending on load, network conditions, concurrent traffic which is transmitted to the client 101, and so forth. This is advantageous since, as compared to downswitching in response to an expired inactivity timer, the duration of the UE 101 and the radio access node of the RAN 102 residing in a high radio state without any data transmission is reduced. Thereby, radio resources are made available to other UEs accessing the RAN 102, and the power consumption of the UE 101 is reduced.

In the following, and with reference to FIG. 3, it is described how the traffic optimization functionality indication may be conveyed in the header of a TCP request, such as request 214 transmitted from the first proxy 103 to the second proxy 104.

Among other information elements, TCP header 300 comprises an "Options" field of variable length (0-320 bits, divisible by 32). The length of this field is determined by the "Data offset" field of the TCP header. Options which are included in the "Options" fields may have up to three fields: Option-kind (one byte), Option-length (one byte), and Option-data (variable length). Typically, the Option-kind field indicates the type of option and may not be omitted. Depending on the kind option the next two fields may be set: the Option-length field indicates the total length of the option, and the Option-data field contains the value of the option, if any.

In accordance with an embodiment of the invention, the traffic optimization functionality indication, comprising information identifying the traffic optimization functions which the first proxy 103 provides, may be conveyed as a TCP option in the "Options" field of the TCP header 300 in different ways. As an example, the Option-kind field of such a TCP option may indicate that the present option carries information about traffic optimization functionality of a proxy which has routed the request. Further, the Option-length field may indicate the length of the Option-data field, which in turn is used to code information about which traffic optimization functions are performed by the first proxy 103. For instance, the Option-data field may comprise a sequence of bits, wherein each bit corresponds to a certain traffic optimization function of a list of traffic optimization functions, and wherein the value of a certain bit, i.e., "0" or "1", indicates whether the corresponding traffic optimization function is performed by the first proxy 103 or not. As an alternative, the Option-data field may carry a list of values, wherein each value is coded as a number of bits and represents a certain traffic optimization function of the list of traffic optimization functions and which is performed by the first proxy 103.

Figure 3:
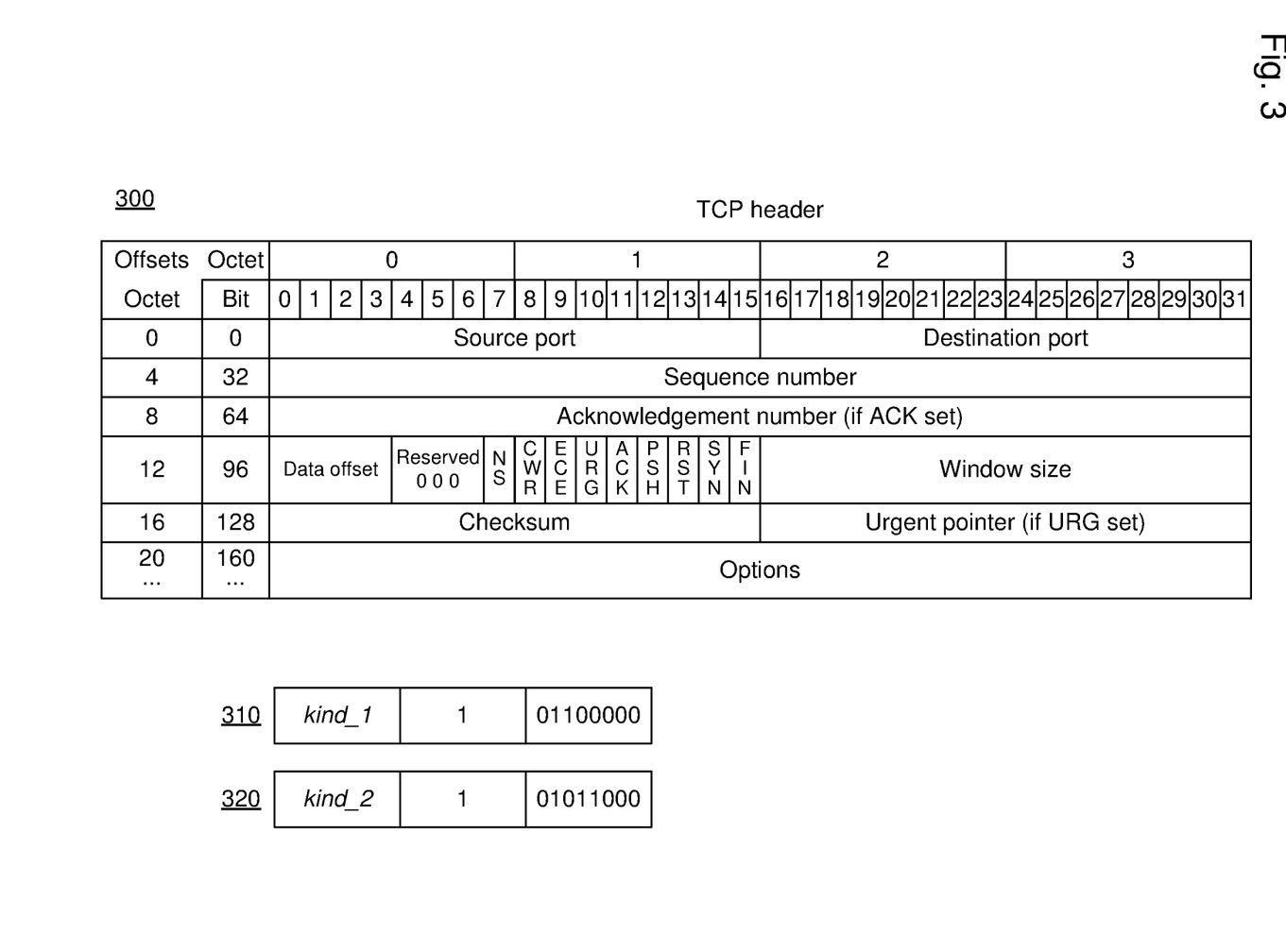
FIG. 3 shows a TCP header, in accordance with embodiments of the invention.

The two alternatives described hereinbefore are illustrated in FIG. 3. Here it is assumed that the first proxy 103 is about to apply a second and a third traffic optimization function of a list comprising at least three traffic optimization functions, and the first proxy 103 includes a corresponding traffic optimization functionality indication into the header 300 of a TCP request. With reference to the first alternative, a TCP option 310 based on bit-wise coding of traffic optimization functions is shown in FIG. 3. The Option-kind field of TCP option 310 (the first field) indicates that this option is of type "kind_1", which here is assumed to be a reserved type for the bit-coded traffic optimization functionality. The second field of TCP option 310, Option-length, specifies the length of the third field of TCP option 310, the Option-data field, to be one byte. The latter field specifies that, in accordance with the example, the second and third traffic optimization function of the list of are performed by the first proxy 103 (the second and third bits have value "1", all other bits have value "0").

The second alternative is illustrated by TCP option 320. In TCP options 320, the Option-kind field indicates that this option is of type "kind_2", which here is assumed to be a reserved type for the value-coded traffic optimization functionality indication. The second field of TCP option 320, Option-length, specifies the length of the third field of TCP option 320, the Option-data field, to be one byte. Here, it is assumed that three bits are used for coding each value, thereby allowing to represent up to eight ($2^3$) values. In the Option-data field of TCP option 320, the first three bits ("010") indicate that the second traffic optimization function ($0 \cdot 2^0 + 1 \cdot 2^1 + 0 \cdot 2^2 = 2$) is performed by the first proxy 103, and the following three bits ("110") indicate that the third traffic optimization function ($1 \cdot 2^0 + 1 \cdot 2^1 + 0 \cdot 2^2 = 3$) is performed by the first proxy 103. The remaining two bits are padded with zeros.

It will be appreciated that the signaling of the traffic optimization functionality indication by the first proxy 103 to the second proxy 104 in accordance with an embodiment of the invention requires both proxies 103 and 104 to us a common way of coding the information comprised in the traffic optimization functionality indication.

As an alternative, embodiments of the invention may be based on signaling the traffic optimization functionality indication in an IP header of an IP request. For instance, in an IPv4 header the traffic optimization functionality indication may be conveyed in the "Options" field of the IP header in a manner similar to what has been described with respect to TCP headers hereinbefore. In an IPv6 header, the traffic optimization functionality indication may be conveyed as one or more extension headers.

As a further alternative, embodiments of the invention may be based on signaling the traffic optimization functionality indication in an HTTP header of an HTTP request. For instance, information describing the traffic optimization functions which are performed by the first proxy may be signaled by including additional header fields into the HTTP request, e.g., non-standard header fields such as "X-Shaping: 010000" (i.e., bit-coded or value-coded) or "X-Shaping: pacing=true" (indicating that a function called "pacing" is performed by the first proxy).

In the following, embodiments of the methods of optimizing downlink traffic in a communications network are described.

Figure 4:
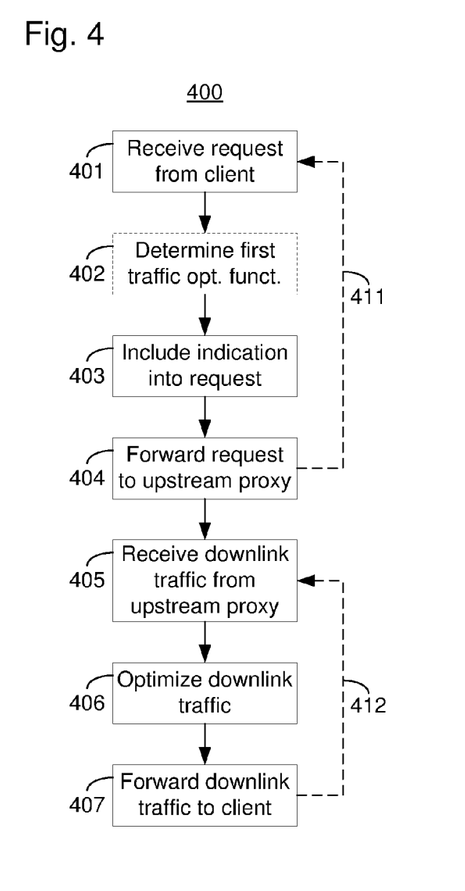
FIG. 4 shows a method of the first network node of optimizing downlink traffic, in accordance with embodiments of the invention.

In FIG. 4, an embodiment of the method 400 of optimizing downlink traffic in a communications network destined for a UE, such as UE 101 in communications network 100, is shown. The downlink traffic is delivered to the client via a RAN. The method 400 is performed by a first network node which is arranged for providing traffic optimization of downlink traffic, e.g., the first proxy 103, and which is located downstream with respect to a second network node providing traffic optimization of downlink traffic, e.g., the second proxy 104. The method 400 comprises receiving 401 from the client a request for content, including 403 a traffic optimization functionality indication into the request, and forwarding 404 the request to the second network node. The method 400 further comprises receiving 405 the downlink traffic from the second network node, optimizing 406 the downlink traffic according to the first traffic optimization functionality, and forwarding 407 the downlink traffic to the client. Optionally, if the traffic optimization functionality provided by the first network node comprises several traffic optimization functions, the method 400 may further comprise selecting 402 the traffic optimization functions comprised in the first traffic optimization functionality based on a type of traffic the request relates to. That is, the first network node may, in accordance with method 400, select one or more functions out of a list of traffic optimization functions provided by the first network node.

Further with reference to FIG. 4, an embodiment of the invention may be envisaged in which the method 400 is performed as two separate sequences, or processes, rather than one. That is, rather than performing the sequence of steps 401 to 407 repetitively, a sequence of steps 401 to 404 may be performed repetitively, and a sequence steps 405 to 407 may be performed repetitively and concurrently to, i.e., in parallel with, the sequence of steps 401 to 404, as is indicated by arrows 411 and 412 in FIG. 4. To this end, steps 401 to 404 relate to processing uplink traffic, i.e., requests for content which are sent from the client and which are forwarded to the second network node after a traffic optimization indication is included, whereas steps 405 to 407 relate to processing downlink traffic, i.e., optimizing the downlink traffic.

Figure 5:
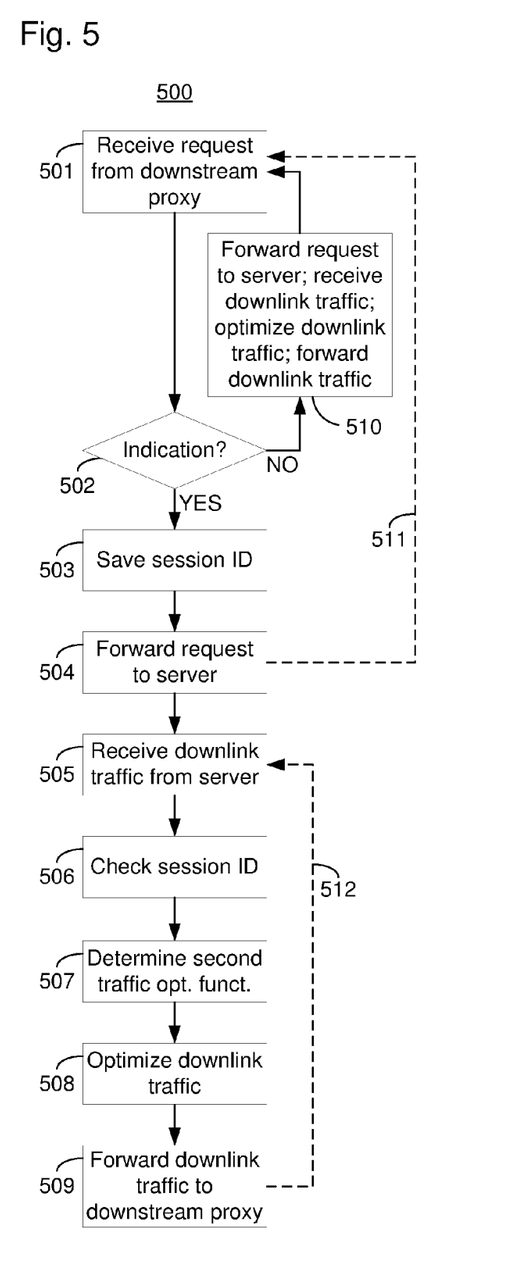
FIG. 5 shows a method of the second network node of optimizing downlink traffic, in accordance with embodiments of the invention.

In FIG. 5, an embodiment of the method 500 of optimizing downlink traffic in a communications network destined for a UE, such as UE 101 in communications network 100, is shown. The downlink traffic is delivered to the client via a RAN. The method 500 is performed by a second network node which is arranged for providing traffic optimization of downlink traffic, e.g., the second proxy 104, and which is located upstream with respect to the first network node, e.g., the first proxy 103. The method 500 comprises receiving 501 from the first network node a request for content and determining 502 whether the request comprises a traffic optimization functionality indication. If the request comprises a traffic optimization functionality indication 502 ("YES" in FIG. 5), the method 500 continues with saving information 503 pertaining to a communication session to which the request relates and forwarding 504 the request to a server providing the requested content. In step 503, an identifier of the communication session may be stored in a list, a look-up table, or a database, 706. The method 500 further comprises receiving 505 the downlink traffic from the server, determining 506 whether the downlink traffic relates to a request comprising the traffic optimization functionality indication, e.g., by looking up a session identifier of a communication session to which the downlink traffic relates, determining 507 the second traffic optimization functionality, i.e., which type of traffic optimization is to be performed by the second network node, optimizing 508 the downlink traffic, and forwarding 509 the downlink traffic to the first network node. In determining 507 the second traffic optimization functionality, traffic optimization functionality which corresponds to the first traffic optimization functionality, as indicated in the traffic optimization functionality indication, is omitted.

In the event that the request does not comprise any traffic optimization functionality indication 502 ("NO" in FIG. 5), the method 500 continues with 510 forwarding the request to a server providing the content, receiving downlink traffic from the server, optimizing the downlink traffic, and forwarding the downlink traffic to the UE, optionally via the first network node. In other words, if no traffic optimization functionality indication is found, the second network node performs as is known in the art. It will also be appreciated that embodiments of the invention may be envisaged in which the second network node is arranged for receiving a request for content directly from the UE, rather than from the first network node. In this case, the request does not comprise any traffic optimization functionality indication, and the second network node may perform traffic shaping in accordance with what is known in the art.

Further with reference to FIG. 5, an embodiment of the invention may be envisaged in which the method 500 is performed as two separate sequences, or processes, rather than one. That is, rather than performing the sequence of steps 501 to 509 repetitively, a sequence of steps 501 to 504 may be performed repetitively, and a sequence of steps 505 to 509 may be performed repetitively and concurrently to, i.e., in parallel with, the sequence of steps 501 to 504, as is indicated by arrows 511 and 512 in FIG. 5. To this end, steps 501 to 504 relate to processing uplink traffic, i.e., receiving requests for content from the first network node and inspecting the requests for a traffic optimization indication, whereas steps 505 to 509 relate to processing downlink traffic, i.e., looking up a session identifier and optimizing the downlink traffic.

In the following, embodiments of the network nodes for optimizing downlink traffic in a communications network are described.

Figure 6:
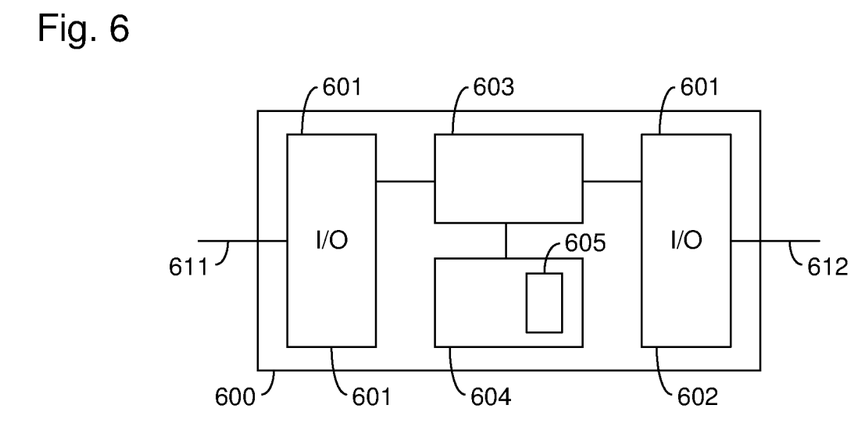
FIG. 6 shows an embodiment of the first network node.

In FIG. 6, an embodiment of the first network node 600 for optimizing downlink traffic in a communications network is shown, wherein the downlink traffic is delivered to a client of the communications network via a RAN. The first network node 600 may, e.g., be the first proxy 103 described hereinbefore, a TCP proxy, an HTTP proxy, or the like. The first network node 600 comprises a first network interface 601 and a second network interface 602. The first network node 600 may be arranged for communicating with a RAN, such as RAN 102 of communications network 100, by means of the first network interface 601, and with a second network node located upstream with respect to the first network node, such as the second proxy 104, by means of the second network interface 602, or vice versa. It will also be appreciated that the first network node 600 may comprise a single network interface only, which is arranged for communicating with the RAN and the second network node. The first network node 600 further comprises a processor 603 and a memory 604. The memory 604 comprises instructions 605 executable by the processor 604, i.e., a computer program or software, whereby the first network node 600 is operative to perform an embodiment of the invention as described hereinbefore with reference to FIGS. 1 to 5.

In particular, the first network node 600 is operative to receive from the client a request for content, include an indication into the request, wherein the indication pertains to a first traffic optimization functionality of the first network node, forward the request to a second network node of the communications network, receive downlink traffic from the second network node, optimize the downlink traffic according to the first traffic optimization functionality, and forward the downlink traffic to the client.

As an alternative, an embodiment of the first network node may comprise means being arranged for receiving from the client a request for content, including an indication into the request, wherein the indication pertains to a first traffic optimization functionality of the first network node, forwarding the request to a second network node of the communications network, receiving downlink traffic from the second network node, optimizing the downlink traffic according to the first traffic optimization functionality, and forwarding the downlink traffic to the client.

As yet another alternative, an embodiment of the first network node may comprise means for receiving from the client a request for content, means for including an indication into the request, wherein the indication pertains to a first traffic optimization functionality of the first network node, means for forwarding the request to a second network node of the communications network, means for receiving downlink traffic from the second network node, means for optimizing the downlink traffic according to the first traffic optimization functionality, and means for forwarding the downlink traffic to the client.

Figure 7:
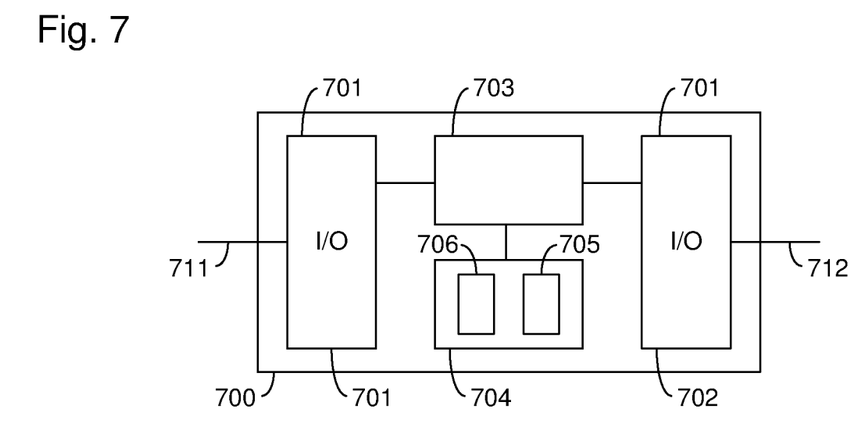
FIG. 7 shows an embodiment of the second network node.

In FIG. 7, an embodiment of the second network node 700 for optimizing downlink traffic in a communications network is shown, wherein the downlink traffic is delivered to a client of the communications network via a RAN. The second network node 700 may, e.g., be the second proxy 104 described hereinbefore, a TCP proxy, an HTTP proxy, or the like. The second network node 700 comprises a first network interface 701 and a second network interface 702. The second network node 700 may be arranged for communicating with a first network node located downstream with respect to the second network node, such as the first proxy 103, by means of the first network interface 701, and with a server providing content which is requested by the client, such as the server 105, by means of the second network interface 702, or vice versa. It will also be appreciated that the second network node 700 may comprise a single network interface only, which is arranged for communicating with the first network node and the server. The second network node 700 further comprises a processor 703 and a memory 704. The memory 704 comprises instructions 705 executable by the processor 704, i.e., a computer program or software, whereby the second network node 700 is operative to perform an embodiment of the invention as described hereinbefore with reference to FIGS. 1 to 5.

In particular, the second network node 700 is operative to receive from the first network node a request for content, determine whether the request comprises an indication pertaining to a first traffic optimization functionality of the first network node, determine whether the downlink traffic relates to a request comprising the traffic optimization functionality indication, optimize the downlink traffic, wherein traffic optimization functionality which corresponds to the first traffic optimization functionality is omitted if the downlink traffic relates to a request comprising the traffic optimization functionality indication, and forward the downlink traffic to the first network node.

As an alternative, an embodiment of the second network node may comprise means being arranged for receiving from the first network node a request for content, determining whether the request comprises an indication pertaining to a first traffic optimization functionality of the first network node, determining whether the downlink traffic relates to a request comprising the traffic optimization functionality indication, optimizing the downlink traffic, wherein traffic optimization functionality which corresponds to the first traffic optimization functionality is omitted if the downlink traffic relates to a request comprising the traffic optimization functionality indication, and forwarding the downlink traffic to the first network node.

The person skilled in the art realizes that the invention by no means is limited to the embodiments described above. On the contrary, many modifications and variations are possible within the scope of the appended claims.

The invention claimed is:

1. A method of optimizing traffic in a communications network comprising a first network node and a second network node, wherein the traffic is delivered to a client of the communications network via a Radio Access Network (RAN), the method comprising:
the first network node receiving from the client a request for content,
the first network node modifying the received request by including into the received request a traffic optimization functionality indication, thereby producing a modified request, the traffic optimization functionality indication for identifying a first traffic optimization functionality of the first network node, and
the first network node forwarding the modified request to the second network node, the second network node being located upstream with respect to the first network node and being arranged for optimizing traffic according to a second traffic optimization functionality which at least in part corresponds to the first traffic optimization functionality,
the second network node receiving the modified request from the first network node,
the second network node determining that the modified request comprises the traffic optimization functionality indication,
the second network node receiving downlink traffic;
the second network node determining that the downlink traffic relates to said modified request comprising the traffic optimization functionality indication,
the second network node optimizing the downlink traffic, wherein traffic optimization functionality which corresponds to the first traffic optimization functionality is omitted as a result of the second network node determining that the downlink traffic relates to said modified request comprising the traffic optimization functionality indication,
the second network node forwarding the downlink traffic to the first network node,
the first network node receiving the downlink traffic from the second network node,
the first network node optimizing the downlink traffic according to the first traffic optimization functionality, and
the first network node forwarding the downlink traffic to the client.

2. The method of claim 1, wherein
the first traffic optimization functionality comprises a first set of one or more traffic optimization functions,
the second traffic optimization functionality comprises a second set of one or more traffic optimization functions.

3. The method of claim 2, wherein optimizing the downlink traffic according to the first traffic optimization functionality comprises the first network node selecting traffic optimization functions from said first set of traffic optimization functions based on a type of downlink traffic to which the request relates.

4. The method of claim 2, wherein at least one of the traffic optimization functions comprised in the first traffic optimization functionality relates to traffic optimization based on an interaction between the first network node and the RAN to effect switching of radio states in the RAN.

5. The method of claim 1, wherein the including a traffic optimization functionality indication into the request is dependent on a type of downlink traffic the request relates to.

6. The method of claim 1, further comprising:
at the second network node, in response to determining that the request comprises the traffic optimization functionality indication, saving information pertaining to a communication session to which the request relates, and
wherein the determining whether the downlink traffic relates to a request comprising the traffic optimization functionality indication is based on the saved information.

7. The method of claim 6, wherein the saving information pertaining to a communication session to which the request relates comprises saving an identifier of the communication session, and wherein the determining whether the downlink traffic relates to a request comprising the traffic optimization functionality indication comprises looking up an identifier of a communication session to which the downlink traffic relates.

8. The method of claim 1, further comprising, at the second network node:
forwarding the request to a server providing the requested content, and
receiving the downlink traffic.

9. The method of claim 1, wherein the traffic optimization functionality indication is included into a header of the request.

10. A method for optimizing traffic in a communications network comprising a first network node and a second network node located upstream with respect to the first network node, the method comprising:
receiving at the first network node a request for content transmitted by a client, the request being a part of a data flow;
modifying the received request, wherein modifying the received request comprises including an indication into the request, thereby generating a modified request, the indication pertaining to a first traffic optimization functionality of the first network node, and the indication indicating that the first network node shall perform said first traffic optimization functionality with respect to downlink traffic that is also part of the data flow and that is transmitted by the second network node to the first network node, which second network node is located upstream with respect to the first network node;
forwarding, by the first network node, the modified request to the second network node;
the first network node receiving from the second network node the downlink traffic, which is part of the data flow;
the first network node optimizing the received downlink traffic according to the first traffic optimization functionality; and
forwarding, by the first network node, the downlink traffic to the client.

11. The method of claim 10, wherein the first traffic optimization functionality comprises one or more traffic optimization functions, and wherein the traffic optimization functionality indication comprises information pertaining to the one or more traffic optimization functions comprised in the first traffic optimization functionality.

12. The method of claim 11, wherein the traffic optimization functions comprised in the first traffic optimization functionality are selected based on a type of downlink traffic the request relates to.

13. The method of claim 11, wherein at least one of the traffic optimization functions comprised in the first traffic optimization functionality relates to traffic optimization based on an interaction between the first network node and the RAN to effect switching of radio states in the RAN.

14. The method of claim 10, wherein the including a traffic optimization functionality indication into the request is dependent on a type of downlink traffic the request relates to.

15. The method of claim 10, wherein the traffic optimization functionality indication is included into a header of the request.

16. A computer program comprising computer program code, the computer program code being adapted, if executed on a processor, to implement the method of claim 10.

17. A computer program product comprising a non-transitory computer readable storage medium, the non-transitory computer readable storage medium having the computer program according to claim 16 embodied therein.

18. A method for optimizing traffic in a communications network comprising a first network node and a second network node, the method comprising:
the second network node receiving a request for content transmitted by the first network node, the first network node being located downstream with respect to the second network node, and the request comprising a traffic optimization functionality indication pertaining to a first traffic optimization functionality of the first network node,
the second network node determining that the request comprises said traffic optimization functionality indication,
the second network node receiving downlink traffic;
the second network node determining that the downlink traffic relates to said request comprising the traffic optimization functionality indication pertaining to the first traffic optimization functionality of the first network node,
the second network node optimizing the downlink traffic to produce optimized downlink traffic, wherein traffic optimization functionality which corresponds to the first traffic optimization functionality is omitted as a result of the second network node determining that the downlink traffic relates to a request comprising the traffic optimization functionality indication, and
the second network node forwarding the optimized downlink traffic to the first network node.

19. The method of claim 18, wherein each of the first and the second traffic optimization functionality comprises one or more traffic optimization functions, and wherein the traffic optimization functionality indication comprises information pertaining to the one or more traffic optimization functions comprised in the first traffic optimization functionality.

20. The method of claim 18, further comprising:
in response to determining that the request comprises the traffic optimization functionality indication, saving information pertaining to a communication session to which the request relates,
and wherein the determining whether the downlink traffic relates to a request comprising the traffic optimization functionality indication is based on the saved information.

21. The method of claim 20, wherein the saving information pertaining to a communication session to which the request relates comprises saving an identifier of the communication session, and wherein the determining whether the downlink traffic relates to a request comprising the traffic optimization functionality indication comprises looking up an identifier of a communication session to which the downlink traffic relates.

22. The method of claim 18, further comprising:
forwarding the request to a server providing the requested content, and
receiving the downlink traffic.

23. The method of claim 18, wherein the traffic optimization functionality indication is comprised in a header of the request.

24. A computer program comprising computer program code, the computer program code being adapted, if executed on a processor, to implement the method of claim 18.

25. A computer program product comprising a non-transitory computer readable storage medium, the non-transitory computer readable storage medium having the computer program of claim 24 embodied therein.

26. The method of claim 18, wherein
the first traffic optimization functionality comprises a first set of one or more traffic optimization functions,
the second traffic optimization functionality comprises a second set of one or more traffic optimization functions, wherein at least one of the traffic optimization functions included in the first set of traffic optimization functions is also included in the second set of traffic optimization functions, and
the step of optimizing the downlink traffic to produce optimized downlink traffic comprises:
the second network node selecting one or more traffic optimization functions from the second set of functions based on, at least in part, the traffic optimization functions included in the first set of functions, and
the second network node applying the selected traffic optimization functions to the received downlink traffic to produce the optimized downlink traffic.

27. The method of claim 26, wherein selecting the one or more traffic optimization functions comprises selecting the one or more traffic optimization functions from a sub-set of the second set of functions, wherein the sub-set of the second set of traffic optimization functions does not include any traffic optimization function included in the first set of traffic optimization functions.

28. A first network node for optimizing downlink traffic in a communications network, wherein the downlink traffic is delivered to a client of the communications network via a Radio Access Network, RAN, the first network node comprising a processor and a memory comprising instructions executable by the processor, wherein the first network node is operative to:
receive from the client a request for content,
modify the received request, wherein the first network node modifies the received request by including an indication into the request, thereby generating a modified request, the indication pertaining to a first traffic optimization functionality of the first network node,
forward the modified request to a second network node of the communications network, the second network node being located upstream with respect to the first network node,
receive downlink traffic from the second network node,
optimize the downlink traffic according to the first traffic optimization functionality, and
forward the downlink traffic to the client.

29. The first network node of claim 28, wherein the first traffic optimization functionality comprises one or more traffic optimization functions, and wherein the traffic optimization functionality indication comprises information pertaining to the one or more traffic optimization functions comprised in the first traffic optimization functionality.

30. The first network node of claim 29, being further operative to select the traffic optimization functions comprised in the first traffic optimization functionality based on a type of downlink traffic the request relates to.

31. The first network node of claim 29, wherein at least one of the traffic optimization functions comprised in the first traffic optimization functionality relates to traffic shaping based on an interaction between the first network node and the RAN to effect switching of radio states in the RAN.

32. The first network node of claim 28, being further operative to include the traffic optimization functionality indication into the request dependent on a type of downlink traffic the request relates to.

33. The first network node of claim 28, being further operative to include the traffic optimization functionality indication into a header of the request.

34. A second network node for optimizing traffic in a communications network, the second network node comprising:
a processor; and
a memory comprising instructions executable by the processor, wherein the second network node is operative to:
receive from a first network node of the communications network a request for content, the first network node being located downstream with respect to the second network node,
determine that the request comprises a traffic optimization functionality indication pertaining to a first traffic optimization functionality of the first network node,
receive downlink traffic,
determine that the downlink traffic relates to the request,
optimize the downlink traffic, wherein traffic optimization functionality which corresponds to the first traffic optimization functionality is omitted as a result of determining that i) the downlink traffic relates to the request and ii) the request comprises the traffic optimization functionality indication pertaining to the first traffic optimization functionality, and
forward the downlink traffic to the first network node.

35. The second network node of claim 34, wherein each of the first and a second traffic optimization functionality comprises one or more traffic optimization functions, and wherein the traffic optimization functionality indication comprises information pertaining to the one or more traffic optimization functions comprised in the first traffic optimization functionality.

36. The second network node of claim 34, being further operative to:
in response to determining that the request comprises the traffic optimization functionality indication, save information pertaining to a communication session to which the request relates, and
determine whether the downlink traffic relates to a to the request comprising the traffic optimization functionality indication based on the saved information.

37. The second network node of claim 36, wherein:
the saved information comprises an identifier of the communication session, and
the second network node uses the saved information to determine whether the downlink traffic relates to the request.

38. The second network node of claim 34, being further operative to:

forward the request to a server providing the requested content, and receive the downlink traffic.

39. The second network node of claim 34, wherein the traffic optimization functionality indication is comprised in a header of the request.

* * * * *